Figure 1:
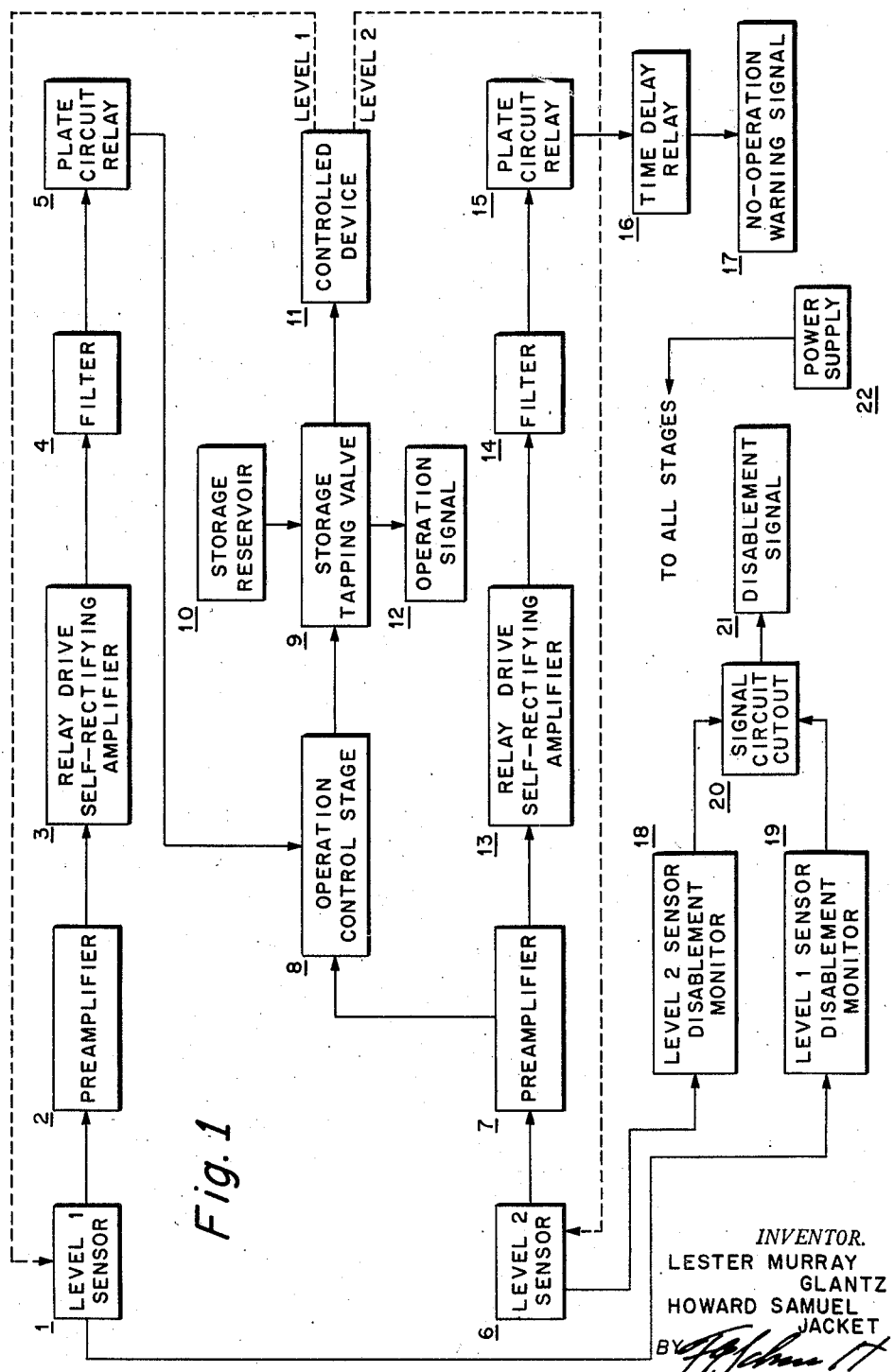

July 16, 1957   L. M. GLANTZ ET AL   2,799,848
TWO-LEVEL CONTROL SYSTEM
Filed Dec. 17, 1953   4 Sheets-Sheet 1

INVENTOR.
LESTER MURRAY GLANTZ
HOWARD SAMUEL JACKET
BY
ATTORNEYS

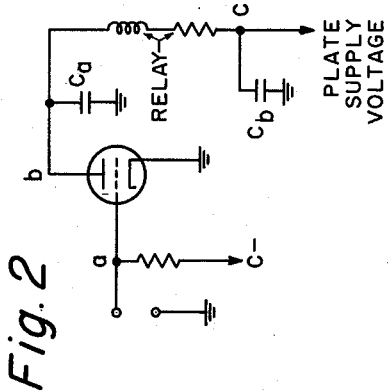
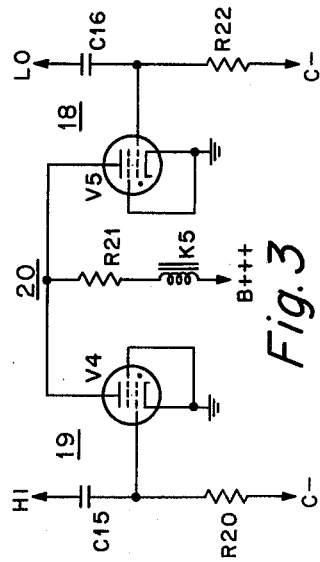
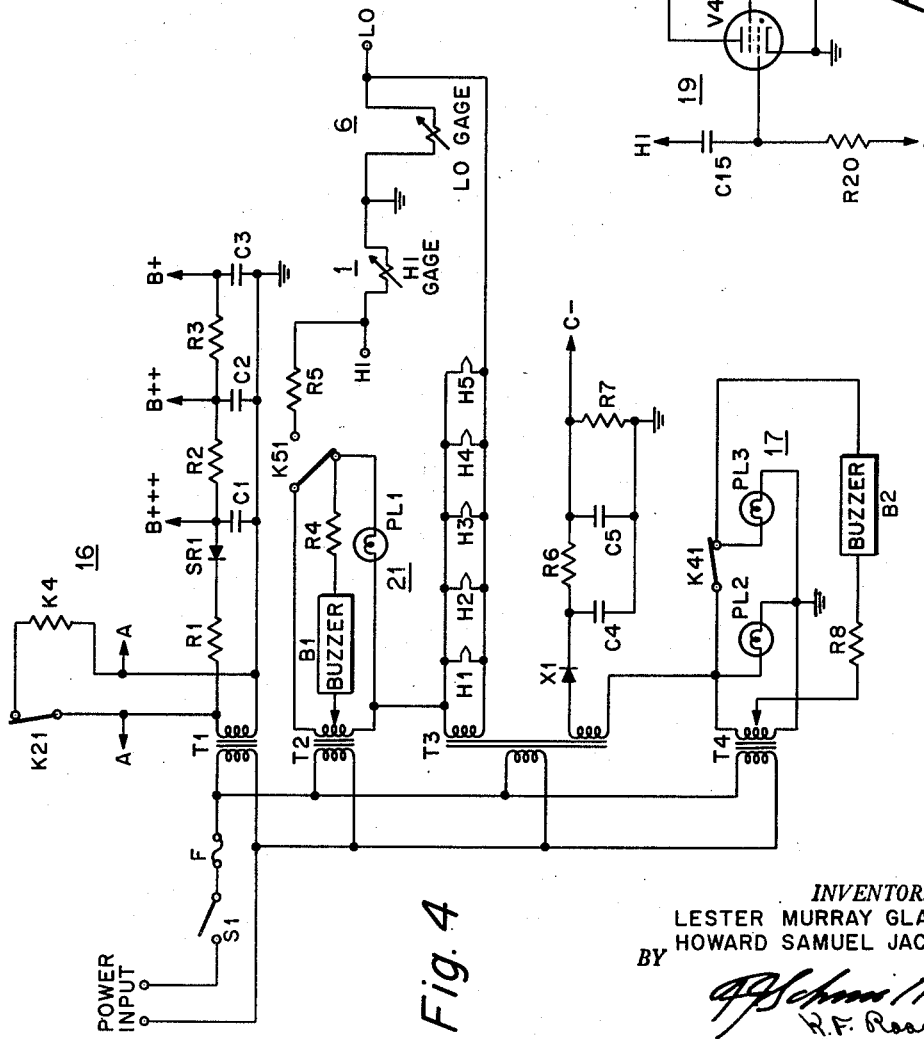

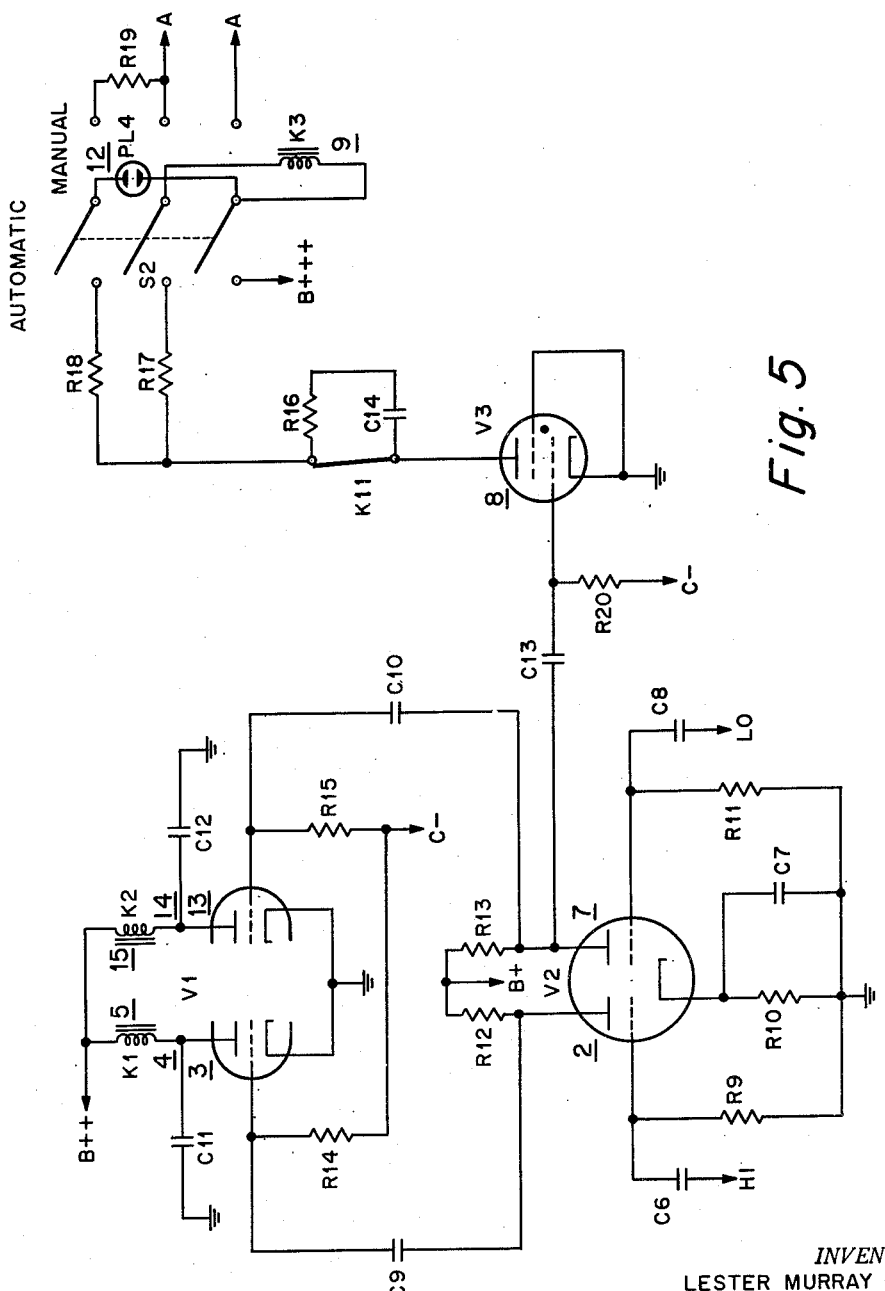

July 16, 1957  L. M. GLANTZ ET AL  2,799,848
TWO-LEVEL CONTROL SYSTEM
Filed Dec. 17, 1953  4 Sheets-Sheet 4

INVENTORS
LESTER MURRAY GLANTZ
HOWARD SAMUEL JACKET
BY
ATTORNEYS

United States Patent Office 2,799,848
Patented July 16, 1957

2,799,848

TWO-LEVEL CONTROL SYSTEM

Lester Murray Glantz, Brooklyn, N. Y., and
Howard Samuel Jacket, Pittsburgh, Pa.

Application December 17, 1953, Serial No. 398,823

17 Claims. (Cl. 340—222)

The invention described herein may be manufactured and used by or for the Government of the United States of America for governmental purposes without the payment of any royalties thereon or therefor.

The present invention relates to a multi-level control system and more particularly to multi-level apparatus for automatic operation to maintain a controlled device, normally subject to fluctuation between two or more physical states and wherein warning and safety devices are included in addition to the apparatus for maintaining the proper levels of physical characteristics.

An illustrative embodiment for control between two levels of such low boiling point liquids as liquid nitrogen, oxygen and air, in such a manner as to maintain this level between two selected limits in an appropriate vessel is shown herein by way of example. The instant invention is particularly useful in maintaining the liquid level between the desired limits in such applications when the liquid is subject to variable or intermittent depletion. However, other processes involving liquids, electric power, mechanical or hydraulic operations or any number of physical states of physical or chemical entities may be similarly controlled. The principle may be extended from two-level to multi-level control by additions of appropriate stages in the device, the stages being coupled to properly disposed sensor devices. Prior art for the liquified gas applications has presented devices which were entirely relay operated, including highly sensitive and relatively fragile relays to actuate multiple relay chains, therefore having the disadvantage of being comparatively unreliable. Prior art devices also did not possess the safety features incorporated in the present invention such as deactivation devices which operate when the sensors are disabled and present warnings when the storage reservoir is empty. In addition, prior art devices have had disadvantages of being possible to tamper with, complexity of operation, and required electrical adjustments thereby rendering the device inoperative if improperly used and making periodic manual adjustment of the relays necessary. This required human supervision by trained personnel made maintenance of precision of control impossible. The present invention eliminates some of the disadvantages of higher initial cost and higher operating cost as well as minimizing unreliability and the relatively large breakdown time loss present in prior known devices.

Accordingly, an object of the invention is to provide apparatus to translate a set of signals from any external system upon which multi-point control of operation is desired to a control mechanism so as to provide control between a plurality of physical levels.

Another object of the invention is to provide mechanism for automatic multi-level control to maintain a control led system between discrete physical states of the system.

Another purpose of the invention is to provide a tamper proof, simple operating mechanism to maintain a system between discrete physical states.

Still another aim of the invention is to present a control apparatus to maintain a controlled device between two discrete physical states and wherein safety and warning mechanism are incorporated.

Another aim of the invention is to provide apparatus capable of maintaining a controlled device within spaced predetermined levels or limits characterizing discrete physical states and wherein is provided at least two sensor devices to sense deviations of a transient from the respective physical states and provide signals to actuate the apparatus as necessary to reverse an undesirable transition and thereby maintain the controlled device between the predetermined discrete physical states.

Another object of the invention is to provide an apparatus to maintain a controlled system within two or more discrete physical levels, which will be automatic in operation and in which necessity for human attendance to the apparatus is eliminated and wherein the system does not require initial adjustment nor maintenance of adjustment devices.

A further purpose is to present controlling apparatus for a controlled device, subject to fluctuations, to maintain the controlled device within physical limits by reliable automatic means, wherein a minimum of human operation and maintenance may be permitted and wherein the advantages of low initial cost, cheapness of operation, elimination of breakdown, elimination of adjustment means, as well as safety and warning devices and sensitive control are included.

Figure 6:
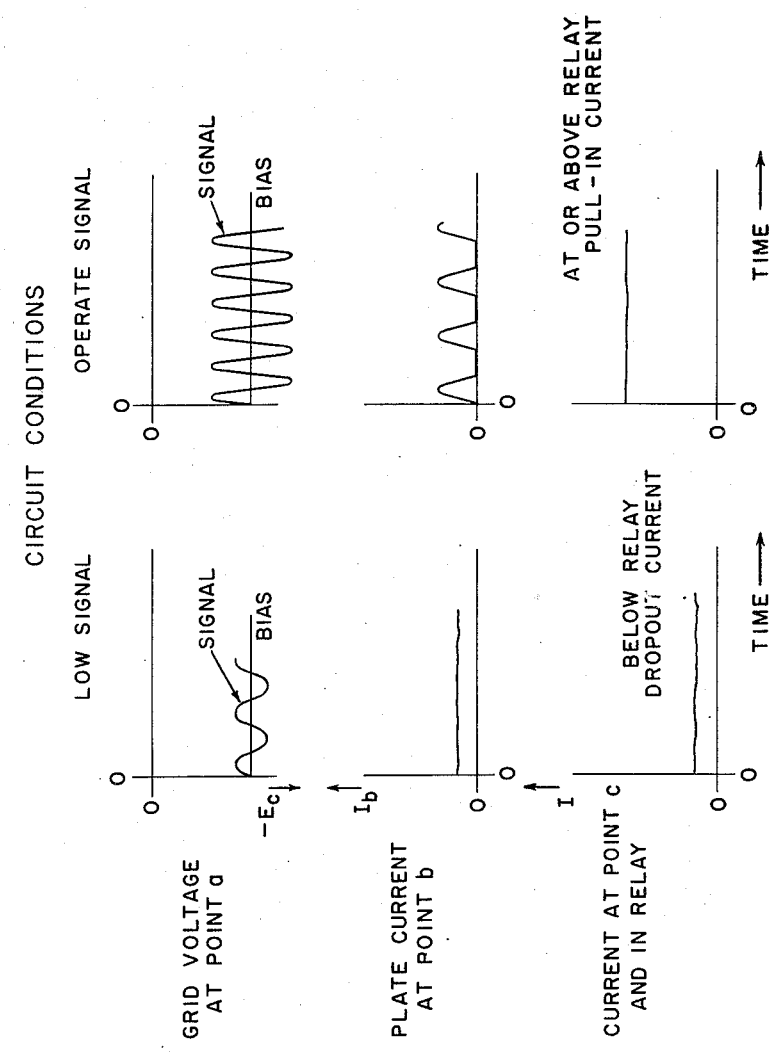

Other objects and many of the attendant advantages of this invention will be readily appreciated as the same becomes better understood by reference to the following detailed description when considered in connection with the accompanying drawings wherein:

Fig. 1 represents a block diagram of the basic device,

Fig. 2 is a schematic diagram of the relay drive self-rectifying amplifier circuit, Fig. 3 is a schematic representation of the sensor disablement monitor apparatus, Fig. 4 presents a schematic representation of the power supply system and shows additional warning and safety features, Fig. 5 is a schematic representation of the preamplifier, operation control stage thyratron, and the relay drive self-rectifying amplifiers of the liquid nitrogen, oxygen and air control application as shown in the illustrative embodiment of the inventive apparatus, and Fig. 6 is a graphical representation of circuit conditions under "low" signal and "operate" signal conditions.

Referring now to the drawings, wherein like reference characters designate like or corresponding parts throughout the several views, there is shown in Fig. 1 a block diagram of the basic device of the instant invention. The controlled device, which is to be controlled between two physical states or levels may have mounted thereon or otherwise attached, level sensors such as level 1 sensor 1 and level 2 sensor 6. If desired, multi-level control can be instituted by having a plurality of sensors such as sensor 1 and sensor 2 disposed at various levels of physical characteristics or physical states of the controlled device. Sensors 1 and 2 generate electrical signals when the respective levels of physical states to which they are adjacent are reached. Level 1 may be assumed to be the upper level and level 2 to be the lower level for purposes of description. When the significant transient in the controlled device falls below level 1, the level 1 sensor adjacent thereto activates a preamplifier 2. Preamplifier 2 is necessary when the signal from the sensor is quite small, but provision is made in the invention for omitting this unit when a sensor signal would be great enough to actuate the following stages. Preamplifier 2 actuates a relay drive self-rectifying amplifier 3, the output of which is smoothed by a filter 4 and operates a plate circuit relay 5. Special amplifier 3 is necessary when the sensor 1 delivers an alternating current (A. C.) signal, and especially when this signal is of two levels itself as may occur in some processes. A direct current (D. C.) sensor might be used as the level 1 sensor, however provision of an A. C. sensor lowers the time constant of the sensor and makes for more rapid indication. If a constant current (either A. C. or D. C.), desirable to enhance predicability of operation, is passed through level 1 sensor 1, the voltage drop across it may increase significantly when the significant transient falls below level 1; different voltages may be produced in the two conditions, only the greater of which signals must be permitted to actuate the following circuits. The relay drive self-rectifying amplifier 3 may be a vacuum tube circuit in which an amplifier having a plate circuit relay as its plate load may be biased such that the plate current normally is either zero (0) or of considerably less value than the pull-in or drop-out current of the relay so that the relay does not operate. However, when level 1 sensor 1 produces a change-of-state signal, the input to relay drive self-rectifying amplifier 3 may operate in a manner similar to a "class B" or "class C" amplifier of audio or radio type in that only the positive portion of the input signal may operate to overcome the grid bias and therefore plate current may flow in response to this signal during a portion of the input cycle only. In that manner, the alternating signal voltage may be converted to a pulsating direct current and amplification and rectification therefore will be accomplished in the single stage. Rectification is necessary since relays sensitive enough to operate in the plate circuits of vacuum tubes are usually D. C. devices and amplification must be great enough to produce a signal large enough to actuate the relay. In order to prevent chattering of the relay from pulsating plate current, the relay is made to form part of a filter circuit 4 which may be completed by addition of appropriate capacitors to complete the action.

It may be noted at this point that the word activate as used herein refers to priming or making a device operative in the event that further application of an actuating or triggering signal is made. The word actuating refers to setting a device into operation, once it has been primed or activated.

Plate circuit relay assembly 5 when actuated may serve to set an operation control stage 8 so as to enable the operation control stage 8 to act upon receiving a signal from the level 2 sensor 6. Stage 8 is a thyratron circuit in which plate circuit relay assembly 5 closes the plate circuit of V3 and puts operating or activating voltage on the plate of the thyratron. This thyratron may be biased to prevent firing before application of an "operate" signal originating at the level 2 sensor 6. Level 2 sensor 6 may operate similar to the level 1 sensor 1, that is, by delivering a single signal when the significant transient drops below level 2 or by delivering two signal levels, one of which must be discriminated against.

When the significant transient of the controlled process falls below level 2 due to still further change in the significant transient, the signal from level 2 sensor 6 may be passed through preamplifier 7. Preamplifier 7 as in the case of preamplifier 2 may be included where the level 2 sensor signal would normally be too small to operate following stages or may be omitted if a large signal is customarily received. A signal through preamplifier 7 may serve to actuate the operation control stage 8 which has been activated by the plate circuit relay assembly 5 in the circuit of the level 1 sensor 1. Operation control stage 8 in turn may actuate the storage tapping valve 9 to permit a measured quantity in the controlled device 11 to be replenished from the storage reservoir 10. Storage reservoir 10 may be a source of some liquid, and electrical power source, a hydraulic oil reservoir in a tension or torsion machine, or any source of physical rehabilitation of the physical medium which is to be controlled within the controlled device. An operation signal device 12 indicates that the replenishment operation is taking place.

After replenishment has caused level 2 to be exceeded the signal from level 2 sensor 6 disappears and "operate" or "actuate" voltage disappears from the operation control stage 8. Since operation control stage 8 is designed to continue to operate when the signal from level 2 sensor 6 is removed (as may be the case with a thyratron), replenishment may continue until level 1 is again reached. The signal at level 1 sensor 1 may then drop, deactivating plate circuit relay assembly 5, thus turning off operation control stage 8 (as by removing positive plate voltage from a thyratron to permit its control grid to take over control). Turning off operation control stage 8 will close the storage tapping valve 9 and restore the controlled device 11 to its fully replenished state. The complete closed-loop system is then ready for another automatic cycle of operation.

As a safety feature, should the storage reservoir 10 be empty, warning is provided of this fact. Preamplifier 7 actuates a second relay drive self-rectifying amplifier 13 which in turn operates a second plate circuit relay assembly 15, a rectified voltage being filtered through the appropriate second filter 14. The plate circuit relay assembly 15 sets a time delay relay assembly 16 into operation, the amount of delay being selected to allow a reasonable time for the replenishment operation to commence. The time involved will vary with the process and devices being controlled. Time delay relay assembly 16 operates a no-operation warning signal device 17 after the termination of the delay period, provided the replenishment operation has not commenced within this period. Time delay relay assembly 16 may also be made to initiate a subsidiary control function or subsidiary control functions other than operation of a no-operation warning signal.

Should either level 1 sensor 1 or level 2 sensor 6 become disabled, as for example with a resistance element being broken, a safety device is provided to interrupt any control operation in process and provide a warning. When such a disablement takes place, the character of the signal at the sensor 1 or sensor 6 output changes from normal state. This change is recognized by level 1 sensor disablement monitor 19 or level 2 sensor disablement monitor 18 according to which level sensor is inoperative. The level sensor disablement monitor 18 or 19 actuates a signal cutout circuit 20 and a disablement signal device 21.

Power supply 22 provides the necessary operating voltages and currents for the respective circuits. The schematic circuits of power supply 22 are shown in detail in Fig. 4.

Fig. 2 shows the basic circuit of the relay drive self-rectifying amplifier of the instant invention which has the advantages of rectifying and amplifying the input signal at one stage instead of a series of stages involving separate amplification and rectification before relay actuation may take place. The circuit may function equally well with D. C. actuation if used, a D. C. signal then being used to overcome the bias. However, its application as a self-rectifying amplifier is intended herein to be used with A. C. excitation. The circuit operates as follows: An input signal from the level 1 sensor 1 or level 2 sensor 6 will overcome the negative bias at the grid of the relay self-rectifying amplifier causing conduction to take place. Inasmuch as the grid is sufficiently negatively biased, only the positive portions of an A. C. input signal will serve to cause conduction. This causes a series of current pulses to appear at the plate or anode. A relay inductor in the plate or anode circuit is made part of a filter system, the remaining part being the two capacitors in the plate circuit to smooth out the rectified pulses and thereby cause smooth operation of the plate relay inductor. Thus amplification and rectification of the signal may be accomplished in a single stage and the amplified signal may be great enough to actuate the relay. This relay will of course in turn activate or actuate the operation control stage depending upon whether the signal input is from the level 1 sensor or level 2 sensor.

Figs. 3, 4, and 5 show the specific circuitry of the illustrative embodiment of the instant invention. For purposes of illustration a system to be applied to control of the level of such low boiling point liquids as liquid nitrogen, liquid oxygen, and liquid air, in such a manner as to maintain the level between two selected limits in an appropriate vessel is shown. This illustrative system automatically maintains the level of any of the liquified gases mentioned between two selected levels in a suitable vessel by automatic replenishment of the liquid as the supply in that vessel is consumed. Safety features as described above for the basic device are incorporated as are facilities for manual filling of the vessel from the storage reservoir should that become desirable. An example of the use of this illustrative device is the provision of a reliable, automatic liquid gas source for cold trap operation in a high-vacuum pumping system.

Referring to Fig. 4, a 117 volt 60 cycle per second alternating current (A. C.) may be used as primary power and fed through line switch S1 and fuse F. As a safety measure and in order to prevent accidental operation of the automatic or manual features, switch S1 must be closed before any of the functions may take place. Power for the unit is obtained from transformers T1, T2, T3, and T4. Transformer T1 is an isolation transformer to separate the high voltage D. C. (direct current) supply from the line. A 1 to 1 transformation ratio transformer has been used satisfactorily, however, a step-up transformer could be used if required for a particular tube circuit. The secondary of transformer T1 feeds a selenium rectifier SR1 through a current-limiting resistor R1, the pulsating D. C. output of the rectifier being smoothed by the resistance-capacitance filter comprising the capacitors C1, C2 and C3 and the resistors R2 and R3. Resistor R2 and resistor R3 act also as a bleeder and provide three different voltages at three voltage output taps, giving a B+, B++, and B+++ voltage supply to yield respectively, higher degrees of filtering and different voltages as required by the several circuits.

Transformers T2, T3 and T4 may be standard filament transformers supplying a variety of required voltages. The arrangement shown presents a specific group of commercially available transformers, other combinations which perform the same functions may be used if found desirable. A 6.3 volt winding on transformer T3 may be used to supply the 5 tube heaters H1, H2, H3, H4 and H5. This fairly heavy constant load stabilizes the output voltage of transformer T3 to improve the performance of the constant current circuit fed by it in conjunction with transformer T2. This circuit supplies current to the two sensors, the "Hi gage" (high gage) and "Lo gage" (low gage) corresponding to level 1 and level 2 of Fig. 1. The secondary winding of transformer T2 is connected in series with the 6.3 volt winding of transformer T3 and phased such as to produce a sum voltage across their joint output, which feeds resistor R5 in series with the two gages through the normally closed relay contacts K51. Since resistor R5 is approximately 10 times the resistance value of the two gages, when they are above liquid, and more when they are in liquid, the effective resistor R5, in addition to limiting the current to the rated value for the gages (90 to 100 milliamperes for use with applications such as liquid nitrogen, oxygen, and air) is to provide essentially a constant current circuit and thereby increase the predictability of the gage outputs. For this purpose an increased voltage is provided by a series summation of the voltage of transformer T2 with the voltage of the pertinent winding of transformer T3.

The common line between the gages is grounded to provide a signal reference. The signals are picked off from the terminals marked "Hi" and "Lo." This ground, being only a few ohms resistance from one side of the heater chain also effectively grounds that side of the chain and reduces hum effects in the respective tubes. Relay contacts K51 form part of the broken gage safety circuit. Should either gage break, the controlled process must be interrupted, as explained earlier. In the event of this breakdown, the full supply voltage effectively appears across the broken gage because of the incurred discontinuity, and the fact that the resistance of the remaining functional sensor is effectively a short circuit compared to the open circuit resistance of the broken sensor. Therefore, the full supply voltage appearing between ground and the associated "Hi" or "Lo" terminal of the broken gage is applied to either sensor disablement monitor, tube V4 or V5, as appropriate. These tubes may be thyratrons biased so as not to fire at the normal gage signal levels but which will operate to fire at the full supply voltage. As shown best in Fig. 3 in the associated tube circuits, coupling capacitors C15 and C16 isolate the grids of tubes V4 and V5 from the gage circuit and its low resistance paths to ground. Grid return resistors R20 and R22 are connected to the negative bias supply labeled C—. B+++ plate voltage is provided through plate load resistor R21 and the plate disposed relay K5.

Firing of either thyratron V4 or thyratron V5 causes relay K5 to become energized to operate its contact K51 which then interrupts the gage circuit, at the same time turning on the broken gage pilot light PL1 and the warning buzzer B1. (Any desired combination of local and remote lights and buzzers or bells can be supplied if found desirable.) The transformer center tap and dropping resistor R4 may be used in this instance to match the characteristics of the particular commercial buzzer used. The characteristics of safety load circuit R21 and K5 are chosen such as to limit the load current to a low value and thereby prevent excessive heating in the case of prolonged operation, even if both tubes are simultaneously caused to fire through the common load. Inasmuch as tubes V4 and V5 are thyratrons, the important feature of a thyratron circuit is utilized for further safety in that the safety action continues after the danger signal is eliminated by relay K5 operation, and until an attendant turns off the device with line switch S1 (and thereby removes thyratron plate voltage) to perform repairs. Until S1 is turned off to reduce the plate voltage of the thyratrons below their cathode voltage, the thyratrons will remain in ionization to allow continued safety. Provision may be made for a manual control of filling the controlled vessel should it be necessary during an emergency. As will be shown later when thyratron V4 or thyratron V5 fires, the operation control stage, thyratron V3, is prevented from firing. Therefore since thyratron V3 normally draws the greatest load current in the device, the power supply current capacity need not be increased to accommodate this safety circuit.

Referring further to Fig. 4, the 5 volt winding of transformer T3 is connected in series with the secondary of transformer T4 and additively phased to provide voltage for the negative bias supply. The input voltage is rectified by reverse-connected crystal rectifier X1 and filtered by the resistance-capacitance network comprising capacitors C4 and C5 and resistor R6. The bias voltage, C—, is developed across load resistor R7.

Transformer T4 supplies power to the power pilot light PL2, which indicates when power is supplied to the device. It also powers the reservoir empty warning signals in a manner to be described later.

Referring to Fig. 5, vacuum tube V2 acts as the preamplifier to increase the gage signal levels, one half operating from the "Hi gage" and the other half from the "Lo gage" as indicated, the grids being coupled from those gages through capacitors C6 and C8 respectively. The circuit acts as a conventional amplifier, having a cathode bias resistor R10 and bypass capacitor C7, grid return resistors R9 and R11 respectively, and anode or plate load resistors R12 and R13.

The two sections of vacuum tube V1 are the relay drive self-rectifying amplifiers described in general terms heretofore. The cathodes of these stages are tied together and grounded and the grids are biased from the C— supply through the grid return resistors R14 and R15. The grids are driven from preamplifiers V2 through coupling capacitors C9 and C10 respectively. It may be noted that in the particular application of the illustrative embodiment applied to the liquids stated, the sensors may have two-state operation, as discussed earlier. Relays K1 and K2 are the respective anode or plate loads, with capacitors C11, C12 and C2 (in the power supply Fig. 4) completing the filter circuits. A type 12AU7 tube has been used satisfactorily for the purpose of relay drive self-rectifying tube V1. In this tube efficient operation is obtained when the bias is of the order of −14 volts to −16 volts, the plate voltage being about 150 volts and the plate circuit relays being 5000 ohms, 3.5 milliampere units.

In operation, when the "Hi gage" adjacent to level 1 comes out of liquid, the increased signal from sensor 1 activates relay K1 and closes contacts K11, applying plate voltage to the thyratron V3, which is the operation control stage 8. When the "Lo gage" adjacent to level 2 comes out of liquid, a firing signal initiated by sensor 6 is applied to the grid of thyratron V3 through coupling capacitor C13, operating from the voltage across load resistor R13 in the plate circuit of preamplifier V2. The grid of operation control stage V3 receives its negative bias through grid return resistor R20, being connected to C— through that resistor. The thyratron load is composed of solenoid valve K3, the storage tapping valve, and current limiting resistor R17. For automatic action to occur, transfer switch S2 must be in automatic position. Neon pilot light PL4 and resistor R18 form an operation signal by responding to the voltage drop across resistor R17 and relay K3 when operation control stage V3 is conducting.

As the controlled vessel fills while solenoid valve K3 is operating, the "Lo gage," level 2 sensor 6, once again is immersed in liquid and the signal disappears from the grid of thyratron V3, the operation control stage, which continues to fire in accordance with the characteristics of the thyratron. Thus the storage reservoir 10 continues to be tapped until the level of the liquid in the controlled vessel reaches and immerses the "Hi gage," level 1 sensor 1 at which point relay K1 is deactivated, contacts K11 open, the plate circuit of thyratron V3 is broken, and valve K3 closes. Capacitor C14 and resistor R16 form an arc suppressing network across the relay contacts. The device is then ready for another automatic cycle of operation.

It may be observed at this point that the safety circuit comprising broken gage or sensor monitors V4 and V5 operates to disable the thyratron V3. In removing voltages from the gages, relay K1 is prevented from operating or is deactivated, and the thyratron V3 plate circuit is open. For manual operation of the solenoid valve K3, switch S2 is thrown to the "manual" position to operate relay K3 directly from the secondary of isolation transformer T1 and appropriately connected signal PL4 through dropping resistor R19.

An additional safety circuit is set in action whenever the low gage comes out of liquid, operating plate circuit relay K2 of tube V1 as well as the thyratron V3. Relay K2 in turn applies operating voltage to time delay relay K4 as shown in Fig. 4 by closing of the contact K21 of relay K2, this voltage being removed when the low gage is once more immersed in liquid. For liquid nitrogen, liquid oxygen, and liquid air applications filling to this point usually takes place in about 30 seconds. Allowing a 4 to 1 lag factor, relay K4 is given a delay of 120 seconds and closes contacts K41 in the secondary of transformer T4, if the operating voltage is not removed by the end of this period. Closing of the contacts K41 is indicated by pilot light PL3, buzzer B2 and any additional warnings that may be desired to be provided. This gives the information that the storage reservoir is empty. Closing of contact K41 applies power to reservoir empty pilot light PL3, warning buzzer B2 and current limiting resistor R8. If desired, relay K4 can also be made to perform other control functions, such as transferring the valve input from one storage reservoir to another.

Thus it may readily be seen that Fig. 1 shows a block diagram of a basic device for maintaining a controlled device between two or more physical limits or levels, as for example, a first level and a second level. The device of Fig. 1 is applicable to any type of physical process within the limits of the system. Fig. 2 presents the relay drive self-rectifying amplifier circuit in general terms as applicable to any control system. Figs. 3, 4 and 5 present a particular system which is especially applicable to uses for liquid nitrogen, air and other liquified gases. A complete table of representative values of the device of Figs. 3, 4 and 5 to show values which have proved extremely satisfactory in test operations for the particular applications and which may be applied to other applications is presented in column 9 of the specification.

Referring to Fig. 6, there is therein shown the circuit conditions involved in the relay drive self-rectifying amplifier of Fig. 2. At the grid of the amplifier, under low signal conditions a relatively low value of signal appears providing a steady current at the plate of that stage insufficient to operate the relay in the plate circuit, that is below the relay drop out current as shown in the lower left hand graph. As shown at the right under "operate" signal conditions, the signal at the grid input is relatively large leading to a relatively large pulsating direct current output at the plate of the amplifier. This pulsating current is smoothed by the inductance and resistance of the relay acting in concert with capacitor $C_a$ and capacitor $C_b$, filter capacitors forming a pi-filter smoothing circuit. $C_b$ as shown in Fig. 4 may be part of the power supply which furnishes the plate supply voltage. It should be understood herein that use of a triode is merely illustrative and that other tube types may readily be utilized. Further, the sinusoidal and D. C. levels shown in Fig. 6 are not necessarily to scale and are merely representative to indicate a qualitative relationship.

In the showing of Figs. 3, 4 and 5 all relays are shown in operating condition with the contacts in operative position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. For example, it may be emphasized that the two-level control system embodiment discussed is merely illustrative of the invention. Multipoint control is contemplated and is within the scope of the invention. The liquid gas application is merely an example of many applications to which the invention may be applied. It is within the purview of one skilled in the art to initiate control actions or to key signals at points intermediate between the two chosen limits, additional gages (sensors) may be introduced in the controlled vessel at the desired points and made to operate their own preamplifiers and additional control of signal circuits. A number of alternate methods are possible within the scope of this invention, such as, by use of electrical latching and unlatching relays in place of the thyratrons, the value of the bias supply to the relay drive self-rectifying amplifier can be varied, a diode rectifier could be put in series with a plate circuit of this amplifier tube, thus yielding the same type of action. Prerectification is also within the scope of the invention. The tubes and various part values shown are merely shown by way of illustration and are in nowise to be considered as limitations of the inventive device. Combined tubes are contemplated as able to be used in place of the separate stages shown. The broken gage or sensor circuit could use a relay arrangement with coil and contacts in series with the gages with the circuit being interrupted if a gage should break. The inventive device is applicable to many other uses besides maintenance of the level of liquid in a container between two points, for example stretch or torsion of a bar between two limits, power consumption of a device between two values, or maintenance of a physical condition between two limits are equally applicable and within the scope of the instant invention. A D. C. signal sensor could be introduced in the place of the A. C. sensor used in the illustrative embodiment.

Obviously many modifications and variations of the present invention are possible in the light of the above teachings. It is therefore to be understood that within the scope of the appended claims the invention may be practiced otherwise than as specifically described.

*Table of illustrative values and designations of components*

| Part | Value or Designation | |
|---|---|---|
| | Resistance ohms ($\Omega$) | Power rating, watts |
| A. Resistor: | | |
| R1 | 5 | |
| R2 | 200 | 1 |
| R3, R6 | 1000 | |
| R4, R8 | 5 | 2 |
| R5 | 120 | 5 |
| R7 | 75K | |
| R9, R11 | 500K | |
| R10 | 200 | |
| R12, R13 | 10K | |
| R14, R15, R19 | 200K | |
| R16 | 100 | 1 |
| R17 | 1000 | 25-50 |
| R18 | 100K | |

(Resistors have ½ watt rating unless indicated otherwise)

| Part | Capacitance microfarads ($\mu f$.) | Rating (volts) |
|---|---|---|
| B. Capacitor: | | |
| C1 | 60 | 300 |
| C2 | 40 | 300 |
| C3, C11, C12 | 20 | 300 |
| C4, C5, C7 | 20 | 25 |
| C6, C8, C9, C10 | 0.1 | 600 |
| C13, C14 | 0.01 | 600 |

| Part | Value or Designation |
|---|---|
| Relay: | |
| K1, K2 | Potter & Brumfield SM5LS, 5,000 $\Omega$ sealed relay. |
| K3 | General Control Type K-20-1 Cat. No. 20R2078, single seated solenoid valve. |
| K4 | Amperite 115N0120 Thermal delay relay. |
| K5 | Potter & Brumfield SM5LG, 2,000 $\Omega$ sealed relay. |
| Transformer: | |
| T1 | Merit P-3096 Isolation Transformer. |
| T2, T4 | Merit P-2944 or Stancor, P-6134 Filament Transformer. |
| T3 | Merit P-3041 Filament Transformer. |
| Buzzer: | |
| B1, B2 | Johnson Speedex Buzzers. |
| Rectifier: | |
| SR1 | Selenium Rectifier (150 milliamperes). |
| X1 | IN 34. |
| Fuse: | |
| F | 1 ampere. |
| Light— | |
| PL1, PL2, PL3 | No. 47. |
| PL4 (Neon) | Ne 51. |
| Tube: | |
| V1 | 12AU7. |
| V2 | 6J6. |
| V3, V4, V5 | 2D21. |
| (K=$10^3$ or 1,000) | |

What is claimed is:

1. An automatic multi-level control system for maintaining a physical process between at least two discrete states characterized by at least a first relatively higher level and a second relatively lower level comprising first signal generating sensor means located adjacent the first level for sensing deviations in the system from a predetermined normal condition at the first level, second signal generating sensor means located adjacent the second level for sensing deviations in the system from a predetermined normal condition at the second level, operation control activating means sensitive to said first level sensor means, operation control actuating means sensitive to second level sensor means, an operation control stage activated by said activating means and actuated by said actuating means, a storage tapping valve operated when said operation control stage is actuated, a storage reservoir effective to return the system to normal condition at a point not above said first level upon operation of said storage tapping valve.

2. The device of claim 1 wherein said second level sensor also activates means for operating a no-operation warning signal after a time delay, and including sensor disablement monitor means to generate a disablement signal upon failure of said first level sensor or said second level sensor.

3. An automatic two-level control system for maintaining a physical process between two discrete states characterized by a first fixed level and a second fixed level, comprising a first sensor located adjacent and sensitive to changes in the system at the first level and generating a signal in response to a transient passing this level, a first preamplifier to amplify signals from the first sensor, a relay drive self-rectifying amplifier to amplify and rectify said signals, a filter to smooth out said rectified signals, a plate circuit relay for said first level sensor signals, an operation control stage, the signals from said first level sensor upon energizing the relay serving to activate said operation control stage, a second sensor located adjacent and sensitive to changes in the system at the second level, said second sensor generating signals in response to a transient passing said second level, a second preamplifier to amplify the signals from said second sensor, said last named signals serving to actuate said activated operation control stage, a storage reservoir, a storage tapping valve responsive to signals of said actuated operation control stage to allow flow from said storage reservoir, an operation signal circuit to give indication when said storage tapping valve is in operation, a controlled device controlled by said two-level control system and operating between the first level and the second level, said controlled device being replenished from the storage reservoir upon action of the storage tapping valve in response to the control system operation, the operation control system remaining in operation after removal of said second level sensor signal and continuing until said first level sensor signal is removed, the signals from the second level sensor and the second level preamplifier serving to actuate a second relay drive self-rectifying amplifier, said second relay drive self-rectifying amplifier amplifying and rectifying said last-named signals, a second filter to smooth out said rectified signals, a second plate circuit relay operated by said filtered signals and serving to actuate a time delay relay, said time delay relay operating after a predetermined time interval in the presence of signals from said second level sensor and serving to actuate a no-operation warning signal device when replenishment does not commence within said predetermined time interval, said no-operation warning signal device being adapted to actuate an emergency control system which operates upon failure of the storage reservoir to replenish the controlled device to the second level within the predetermined time interval, and a power supply system to supply power to said elecronic circuits.

4. The structure of claim 3 including a disablement monitor system sensitive to failures of the first level sensor and sensitive to disablement of the second level sensor, the disablement monitor system comprising a sensor disablement monitor sensitive to disablement of the first level sensor, a sensor disablement monitor sensitive to disablement of the second level sensor, a signal circuit cutout device responsive to signals from the disablement monitors, the signal circuit cutout device in actuated condition serving to render the automatic two-level control system inoperative, the inoperative control system remaining inoperation until said disablement has been corrected, signals from the signal circuit cutout device serving to actuate a disablement signal device to indicate failure of said sensors.

5. In apparatus for maintaining a controlled device between a first physical level and a second physical level and including a first level sensor means responsive to a significant change at said first physical level and a second level sensor means responsive to a significant change at said second physical level, operation control stage means activated by a signal from said first level sensor indicating a significant change at said first level and actuated by a signal from said second level sensor indicating a significant change at said second level, a sensor disablement detecting device comprising a monitor stage sensitive to disablement of said first level sensor, a monitor stage sensitive to disablement of said second level sensor, signal circuit cutout means responsive to operation of either of said monitor stages, and disablement signal indicating means operated by said signal circuit cutout means.

6. In apparatus for maintaining a controlled device between a first physical level and a second physical level and including a first fixedly disposed level sensor to generate a signal indicating a transient passing said first level and a second fixedly disposed level sensor to generate a signal indicating a transient passing said second level, an operation control stage, said first level sensor signal serving to activate the operation control stage, said second level sensor signal serving to actuate the operation control stage, a storage reservoir, means controlled by the operation control stage when the stage is in actuated condition to cause the storage reservoir to replenish the controlled device to the first level, a no-operation warning device comprising a preamplifier to amplify signals from the second level sensor, a relay drive self-rectifying amplifier to rectify and amplify the second level sensor signals passed through the preamplifier, a plate circuit relay, said plate circuit relay including a filter to filter said rectified and amplified signals from the relay drive self-rectifying amplifier, a time delay relay and a no-operation warning signal device, the plate circuit relay serving to actuate the time delay relay, actuation of the time delay relay for a predetermined length of time without deactuation of the operation control stage causing said no-operation warning signal to give an indication signifying depletion of said storage reservoir.

7. Means for maintaining a controlled device between a first physical state level and a second physical state level, said means including a storage reservoir to replenish said controlled device when its physical state reaches the second level, a storage tapping valve device operable to enable said storage reservoir to replenish the controlled device, an operation signal device to indicate replenishing operation of said storage reservoir, an operation control stage, said operation control stage when in actuated condition serving to actuate the storage tapping valve device to enable the storage reservoir to replenish the controlled device, a first level sensor to sense a significant transient passing the first physical state level of the controlled device and generating a signal in response to a significant transient passing the first physical state level, a preamplifier to amplify said sensor generated signal, a relay drive self-rectifying amplifier to amplify and rectify the signals from said preamplifier, a plate circuit relay in the plate circuit of said relay drive self-rectifying amplifier, a filter including said plate circuit relay, said plate circuit relay serving to activate said operation control stage to prime the operation control stage to operate in the presence of an actuating signal, a second level sensor to generate a signal in response to a significant transient passing the second physical state level of the controlled device, a preamplifier to amplify said second sensor generated signal, said last named preamplified signal being fed to the operation control stage to actuate said operation control stage to in turn actuate the storage reservoir controlling tapping valve device, a no-operation warning signal apparatus to indicate depletion of the storage reservoir, and a sensor disablement monitor apparatus to indicate disablement of either the first level sensor or the second level sensor, disablement signal means actuated by the said sensor disablement monitor apparatus, and power supply means to supply power.

8. In a sensor disablement monitor for a two-level control system, a broken sensor monitor circuit comprising a pair of thyratrons, each thyratron having at least three elements, the first of said thyratrons having a control grid negatively biased to prevent ionization in the absence of disablement of a high level sensor, said second thyratron having a control grid negatively biased to prevent ionization in the absence of disablement of a low level sensor, a coupling capacitor at the input of the control grid of each of said thyratrons to provide a malfunction signal, a comparatively high value resistor connected at one end to the junction between the blocking capacitor and the control grid of each tube, and connected at its other end to a negative biasing voltage, thereby permitting maintenance of the negative bias at the control grid of each of said thyratrons, a common plate load comprising a current regulating resistor and a relay coil, one end of said coil being connected to said plate resistor, the other end of said coil being connected to a high voltage power supply source, said malfunction signal from a high level sensor arising due to disablement of said sensor being impressed upon the grid of said first thyratron and causing it to fire, said malfunction signal from a low level sensor arising due to disablement of said sensor being impressed upon the grid of said second thyratron and causing it to fire, current due to firing of at least one of said thyratrons passing through said common plate load and energizing said plate relay, said plate relay having contacts which upon energizing of the relay cause an alarm and safety system to go into operation, said thyratrons continuing to conduct until a master switch in the primary of the power supply system is disengaged.

9. In an apparatus for maintaining a controlled device between a first level state and a second level state, and including at least one level sensor to sense the controlled device passing the respective level states, a sensor disablement monitor device comprising a gas-filled electronic tube, said tube having a plate, a control grid and a cathode, fixed bias means to normally bias said tube to prevent ionization, input coupling means to couple in an altered signal voltage indicative of disablement of the level sensor, an output anode load including a relay, imposition of said altered signal voltage overcoming bias of the gas-filled electronic tube to fire said tube, tube current or firing causing said relay to become energized and remain energized irrespective of removal of said altered signal voltage, said relay having at least one contact, energizing of said relay causing said contact to close to complete the circuit of an alarm system indicating disablement of a sensor element.

10. In an application of a two-level control system; power transformer means comprising input primary inductance means having a plurality of primaries; a fuse and a safety switch leading to an input power source; a secondary to said power transformer means, said secondary comprising a plurality of secondary windings providing sources of required A.-C. voltages providing for complete conductive isolation of apparatus from the power source; a first secondary inductance providing A.-C. voltage excitation for the rectifier of a plate voltage supply; a time delayed first alarm; a time delay relay and a switch in series being disposed across said last-named winding for actuating said time delayed first alarm and control system in the event of failure of the controlled process to take place; a second secondary inductance and a third secondary inductance being connected in series in such manner as to add the voltages of these secondaries, the second of said last-named secondaries providing filament voltage to paralleled tubes of the apparatus, the relatively heavy constant filament load serving to stabilize the voltage of said last-named secondary system, the third secondary inductance being center tapped, said center tap being in series with a warning buzzer and a current limiting resistor; a second alarm means being connected to one end of said third secondary inductance and having its other end connected to the resistor of said buzzer; switching means connected from the other end of said third secondary inductance to said resistor when in operative position and being connected in inoperative position to a third resistor in series with a first level sensor for high gage indication and leading to ground; a second level sensor for low gage indication being connected to ground at one end and at its other end being connected to the side of said second secondary inductance opposite the common junction of the second and third secondary inductances, said third resistance being substantially greater than the combined series resistance of said high and low gages and providing in conjunction with combined voltage of said second and third secondaries a substantially constant current circuit, current through said gages in said constant current circuit remaining constant despite variation of resistance of the gages in response to operating stimuli, said constant current assuring predictability and maximum difference of output voltages from said gages when in operated and non-operated conditions, said low gage offering a low resistance path to ground from one common side of said paralleled filaments effectively grounding said one side of all filaments and providing hum-diminishing action; an additional pair of secondary inductances being connected in series so as to add the output voltages of said inductances, said voltage providing excitation for a negative bias rectifier; one winding of said pair of secondary inductances being center tapped and said center tap being connected to a current limiting resistor and alarm means to indicate operation of said time delayed warning and control system and a switch in series with said last-named alarm means, said switch in operative position being connected to the last-named secondary inductance; alarm means to indicate failure of controlled replenishment process; and a sensor disablement monitor system to set said second named alarm system in operation upon disablement of at least one of said sensors.

11. In a multi-level control system, power supply mechanism comprising an input transformer, said transformer having a primary and a secondary, said secondary having a first side and a second side, a first resistor connected to the first side of said secondary, a selenium rectifier having an anode and a cathode in series with said last-named resistor, a second resistor, in series with said rectifier, a third resistor in series with said second resistor, an output positive voltage tap disposed between said second resistor and said selenium rectifier, an output positive voltage tap connected between said second resistor and said third resistor, and an output positive voltage tap connected at the side of said third resistor opposite the side connected to the second resistor, a first filter capacitor disposed between the junction of the second resistor with the selenium rectifier and ground, a second filter capacitor disposed between the junction of the second and the third resistor and ground, a third filter capacitor disposed between the end of said third resistor opposite the end connected to the second resistor and to ground, the second side of the secondary winding being grounded, and a safety circuit disposed across said transformer secondary including a time delay relay, a second relay contact having its contact closed in replenishing position connected in series to said time delay relay contact and connected to the ungrounded first side of said secondary, thereby providing a plurality of high voltage positive supply voltages and providing for indication when the replenishing operation is not taking place due to exhaustion of a replenishing storage reservoir.

12. In a multi-level control system, power transformer means for providing sensor disablement signals and filament voltages, said means including a first transformer and a second transformer, said first transformer having a primary winding and a secondary winding, said second transformer having a primary winding and more than one secondary winding, the secondary winding of the first transformer and a given secondary winding of the second transformer being connected additively in series, a plurality of tube filaments being disposed across the given secondary winding of the second transformer, a low gage sensor device and a high gage sensor device, a common line from one side of said filaments being connected to said said low gage sensor device, said low gage sensor device being in series with said common line and with ground, a connection extending from ground to one side of said high gage sensor, a resistor in series with said high gage sensor, a tap on the secondary of said first transformer, a buzzer in series with said tap, a resistor in series with said buzzer, a light having one end tied to said last named resistor and its other end tied to the end of the secondary of the first transformer connected to the first secondary of the second transformer, the end of the secondary of the first transformer opposite the end connected to the given secondary of the second transformer having a contact in series with it, said contact selectively engaging the resistor connected to the high gage and the resistor connected to the buzzer and the light, means to project a signal from said high gage sensor and means to project a signal from said low gage sensor, disablement of said high gage sensor or said low gage sensor firing a broken gage monitor to shift said contact to engagement with said buzzer and light system, whereby a warning of disablement will be given, said contact arm normally being connected to the resistor in series with the high gage sensor, the resistor being connected to said high gage sensor having a resistance approximately 10 times the combined resistance of the two gages, when they are above liquid and greater than 10 times when they are in liquid, thereby causing limiting of the current for the rated value of the gages to provide a constant current circuit and thereby increase predictability of the gage outputs, the effective ground of the common filament line being a few ohms from the reference ground between the high gage and the low gage to reduce hum effects in the respective tubes.

13. A multi-level control system for maintaining a controlled device within physical state limits, said apparatus comprising safety and warning mechanism and a power supply including a first transformer having a primary winding and more than one secondary winding, a second transformer having a primary and a secondary winding, a given secondary winding of the first transformer having one end tied to the secondary of the second transformer, a crystal rectifier having a plate and a cathode, said crystal rectifier being tied to the end of the given secondary winding not connected to the secondary of said second transformer and being in series with a resistance filter, the side of the resistance of the filter resistance opposite the rectifier end being at a negative bias potential point, a bleeder resistor disposed between said negative bias potential point and ground, a pair of filter capacitors, one filter capacitor having an end tied to said rectifier and having its other end tied to ground, the second filter capacitor having an end electrically tied to said negative bias point and having its other end electrically tied to ground, thereby providing a negative bias voltage, the secondary of the second transformer having a power pilot light to indicate power-on disposed across it, a relay contact disposed in series with the end of the secondary winding of the second transformer which is tied to the given secondary winding of the first transformer, said contact being closed upon operation of a relay to show an empty reservoir of said control system, a reservoir empty pilot light disposed between the closeable end of said contact arm and the side of the secondary winding of the second transformer opposite the end which is connected to the given secondary winding of the first transformer, a center tap on the secondary winding of the second transformer, a limiting resistor in series with said tap, a buzzer in series with said limiting resistor, the buzzer being connected at its end opposite the center tap connected end to the closeable contact connection point of the relay contact, thereby providing warning means in the event of the reservoir of the control system being empty.

14. A control system for a two-level control device comprising a first preamplifier for receiving high level indicating signals, a second preamplifier for receiving low level indicating signals, the output of said high level signal preamplifier being transmitted to a first relay drive self-rectifying amplifier, output of said second preamplifier being transmitted to a second relay drive self-rectifying amplifier, a second output of said second preamplifier being introduced to an operation control stage, said operation control stage comprising a thyratron biased to a negative voltage to provide zero plate current during no-signal conditions, a plate circuit in said operation control stage, said plate circuit comprising a load resistor and a load solenoid valve, continuity of the plate circuit being controlled by means of a contact which closes under signal receiving conditions of said first relay drive self-rectifying amplifier to activate said control stage, an automatic-manual switch in the plate circuit of the thyratron effective to complete said circuit when in automatic position so as to permit operation of said circuit by said thyratron, a plate voltage supply source, said relay drive self-rectifying amplifiers comprising a pair of at least three-element rectifying amplifiers each having a cathode, a grid, and a plate, a plate load for each self-rectifying amplifier, said plate load comprising a coil of a relay, said self-rectifying amplifiers being negatively biased to provide for negligible current flow in the absence of a signal, an amplified signal from either of said preamplifiers serving to cause current flow in the respective relay drive self-rectifying amplifier following the preamplifier upon which a sensor signal is introduced, said high level signal on being amplified and rectified closing said contact in the operation control thyratron plate circuit to activate said stage, said low level preamplified signal serving to actuate said activated operation control thyratron to permit opening of the solenoid valve, said operation control thyratron continuing to fire after said low level signal is removed and firing until removal of the high level amplified and rectified signal causes the relay contact in the plate circuit of the operation control thyratron to open and stop operation of the thyratron, said low level signal on being amplified serving to energize the relay in the plate circuit of the low level relay drive self-rectifying amplifier, said relay upon being energized closing a contact in a time delay system, thereby permitting a safety system to be put in operation following a time delay, removal of said low level preamplified signal before the end of the time delay causing the time delay safety circuit to become de-energized.

15. Apparatus for maintaining liqnuid level in a vessel between an upper limit and a lower limit, said apparatus comprising a first level sensor to generate a signal upon falling of the liquid below an upper liquid level, a second level sensor to generate a signal upon falling of the liquid below a lower liquid level, a first preamplifier and a second preamplifier to amplify the signals generated by the respective sensors to indicate passing of the respective liquid levels, said preamplifiers each including an anode and a control grid, said preamplifiers having a common cathode, a resistor disposed between said common cathode and ground, a capacitor disposed across said last named resistor, a grid return resistor between the first preamplifier control grid and ground, a second grid return resistor between the second preamplifier control grid and ground, a coupling capacitor to couple signals indicating passing of the upper level from said first sensor into the first preamplifier control grid, a coupling capacitor to couple signals indicating passing of the lower level from the second sensor into the second preamplifier control grid, a first preamplifier anode load resistor, a second preamplifier anode load resistor, means to supply power to said preamplifier anodes, a relay drive self-rectifying amplifier circuit including a first amplifier and a second amplifier, said first amplifier having an anode, a control grid and a cathode, said second amplifier having an anode, a control grid and a cathode, the cathodes of the first and the second amplifiers being tied to each other and grounded, the first amplifier anode of the relay drive self-rectifying amplifier having a bypass capacitor connected from the first amplifier anode to ground and having a plate load comprising a plate relay, said relay having one end tied to the first amplifier anode and having its other end tied to an anode voltage power supply source, a plate load relay having one end tied to said second amplifier anode and having its other end tied to the power supply source, a bypass capacitor between the second amplifier anode and ground, a coupling capacitor disposed between the anode of said first preamplifier and the control grid of said first amplifier, a resistor tied at one end to the control grid of said first amplifier, a second resistor tied at one end to the control grid of the second amplifier, the other end of the first resistor being tied to the other end of the second resistor, a negative bias voltage source, the negative bias voltage source being tied to the tied together ends of the first control grid resistor and the second control grid resistor of the amplifiers, a coupling capacitor disposed between the anode of said second preamplifier and the control grid of said second amplifier, an operation control stage including a gas-filled thyratron tube, signals from said first high level sensor being amplified in the preamplifier and in the first amplifier to produce a current in the first amplifier to energize the relay connected to its anode circuit to activate said thyratron, signals from said second low level sensor being amplified in said second preamplifier and in the second amplifier to produce a current in the second amplifier to energize the relay connected to its anode, said second amplifier relay having a contact to initiate a time delay warning system in relay energized condition, said operaton control stage thyratron including an anode, a cathode and a control grid, a coupling capacitor to couple the control grid of said thyratron from the output at the anode of the second preamplifier, a resistor leading from the control grid of said thyratron to the negative bias supply to render the thyratron normally inoperative, the cathode of the thyratron being grounded, a thyratron anode voltage source, a relay contact between the thyratron anode and the thyratron anode voltage source, the first amplifier relay upon being energized energizing the contact in the anode circuit of said thyratron to supply anode voltage to said thyratron, thereby activating the operation control stage thyratron, at least one thyratron anode load resistor, a thyratron anode load solenoid valve, signals from the second low level sensor being preamplified and conveyed through the operation control stage coupling capacitor to the control grid of the operation control stage to fire the operation control stage when in activated condition, thereby actuating said operation control stage, the solenoid valve anode load of the operation control stage being energized upon firing of the thyratron, said solenoid valve in operative condition replenishing said controlled device by allowing flow from the storage reservoir to the controlled device.

16. Apparatus for maintaining a liquid between a first fixed level and a second fixed level in a vessel, said apparatus comprising first signal generating means to sense and indicate by means of a first signal falling of the liquid level in the vessel below said first level, means to sense and indicate by means of a second signal falling of the liquid in the vessel below said second level, means to amplify and rectify said first level signal and said second level signal, said amplification and rectification means including at least one stage, said stage having a grounded cathode, a control grid and an anode, an anode plate load including a relay in the anode of said stage, an operation control stage including a thyratron, said thyratron having a cathode, a control grid and an anode, anode apparatus in said thyratron including a relay contact responsive to maintain the thyratron anode circuit closed when said relay is energized in response to said first level signal, switching means to switch from automatic to manual operation, a solenoid valve in the anode circuit of the thyratron when said switch is in automatic position, said second level signal being impressed upon the control grid of said thyratron to cause actuation of the thyratron to fire, thereby energizing the solenoid valve, said solenoid valve on being energized causing replenishment of the vessel from a storage reservoir.

17. In a device to maintain contents of a vessel between a first fixed higher level and a second fixed lower level, an operation control stage, a storage reservoir, a storage tapping valve, said operation control stage controlling said storage tapping valve to permit storage reservoir flow to replenish the vessel above the second level and to the first level, said operation control stage comprising a gas-filled tube having an anode and a control grid, said control grid being normally negatively biased to prevent ionization, an operation control stage anode load including a solenoid valve to operate the storage tapping valve, a first sensor device to generate signals indicating falling of the vessel's contents below said first level, a second sensor device to generate signals indicating falling of the vessel's contents below the second level, means responsive to the first sensor signals to activate the gas-filled operation control stage, said last-named means comprising a contact to close the operation control stage anode circuit to permit activation of said operation control stage, said second lever sensor signals serving to overcome bias on the control grid of the operation control stage to cause firing of that stage, firing of the stage energizing the solenoid valve to initiate replenishment of the contents of the vessel.

References Cited in the file of this patent

UNITED STATES PATENTS

| | | |
|---|---|---|
| 2,339,532 | Venable | Jan. 18, 1944 |
| 2,385,161 | Pinkerton | Sept. 18, 1945 |
| 2,394,220 | Wagner | Feb. 5, 1946 |
| 2,460,789 | Thompson | Feb. 1, 1949 |
| 2,547,332 | Loveless et al. | Apr. 3, 1951 |
| 2,551,225 | Spierer | May 1, 1951 |
| 2,664,556 | Sontheimer | Dec. 29, 1953 |

FOREIGN PATENTS

| | | |
|---|---|---|
| 56,246 | Norway | Mar. 2, 1936 |